United States Patent [19]

Hälg

[11] Patent Number: 5,128,537
[45] Date of Patent: Jul. 7, 1992

[54] DEVICE FOR OPTICALLY MEASURING A PRESSURE DIFFERENTIAL

[75] Inventor: Beat Hälg, Cham, Switzerland

[73] Assignee: Landis & Gyr Betriebs AG, Zug, Switzerland

[21] Appl. No.: 700,738

[22] Filed: May 15, 1991

[51] Int. Cl.$^5$ .............................................. G01D 5/34
[52] U.S. Cl. ............................ 250/231.19; 356/352; 73/705
[58] Field of Search ............... 250/231.19; 356/352, 356/35.5; 73/705, 800

[56] References Cited

U.S. PATENT DOCUMENTS

| | | | |
|---|---|---|---|
| 4,682,500 | 7/1987 | Uda | 250/231.19 |
| 4,772,786 | 9/1988 | Langdon | 356/352 |
| 4,926,696 | 5/1990 | Haritonidis et al. | 250/231.19 |
| 4,933,545 | 6/1990 | Saaski et al. | 250/231.19 |
| 4,983,824 | 1/1991 | Saaski et al. | 250/231.19 |

FOREIGN PATENT DOCUMENTS

| | | |
|---|---|---|
| 0013974 | 8/1980 | European Pat. Off. . |
| 0172623 | 2/1986 | European Pat. Off. . |
| 0196784 | 2/1986 | European Pat. Off. . |
| 0309643 | 5/1988 | European Pat. Off. . |
| 3611852 | 10/1986 | Fed. Rep. of Germany . |
| 2202936 | 10/1988 | United Kingdom . |

*Primary Examiner*—David C. Nelms
*Assistant Examiner*—Khaled Shami
*Attorney, Agent, or Firm*—Marmorek, Guttman & Rubenstein

[57] ABSTRACT

A device for optically measuring a pressure difference in a medium by means of a Fabry-Perot interferometer, comprises a transparent plate and a diaphragm block connected to the transparent plate, the diaphragm block comprising a substrate, a measuring diaphragm formed along the inner surface of the substrate, and a spacer separating the inner surface of the transparent plate and the inner surface of the substrate. A first planar mirror is disposed on the inner surface of the plate and a second planar mirror is disposed on the inner surface of the measuring diaphragm so that they constitute the Fabry-Perot interferometer. The measuring diaphragm is shiftable by a distance (H) in response to a pressure difference ($\delta p$) exerted on inner and outer surfaces of the measuring diaphragm whereby the optical length (L) of the Fabry-Perot interferometer changes as a function of the pressure difference ($\delta p$). The substrate includes a depression on one side only so that the material remaining under the depression is of a predetermined thickness and comprises the measuring diaphragm. Since the measuring diaphragm constitutes a portion of the substrate and is a continuation of the crystalline structure of the substrate, there are no mechanical stresses at the joining points of the substrate and the measuring diaphragm. Preferably, the measuring diaphragm constitutes a doped layer of the substrate and serves as an etching barrier for the substrate.

12 Claims, 2 Drawing Sheets

DEVICE FOR OPTICALLY MEASURING A PRESSURE DIFFERENTIAL

FIELD OF THE INVENTION

The instant invention relates to a device for optically measuring a pressure difference in a medium. More particularly, the instant invention relates to a device for optically measuring a pressure difference in a medium utilizing two planar parallel mirrors facing each other and constituting a Fabry-Perot interferometer, one of said mirrors being mounted on a flexible diaphragm. The pressure difference in the medium is applied to both sides of the diaphragm, causing it to flex and change the optical length of the interferometer and thereby the Fabry-Perot interference pattern.

Such devices are used in association with a pinhole diaphragm to determine flow rates, as, for example, in heat quantity meters or with gas and liquid quantity measuring devices.

The utilization of a Fabry-Perot interferometer for measuring pressure, wherein at least one of the mirrors of the interferometer is moved by the resulting force of the pressure acting upon two sides of the mirror and where the resulting displacement is measured optically, is known from EP 0 172 623 A, for example. The Fabry-Perot interferometer disclosed therein consists of a glass substrate with an etched depression and a diaphragm that can be made from silicon, for example, and is stretched over the depression. The bottom of the depression and the side of the diaphragm facing towards the glass substrate are metal-coated so that the arrangement constitutes an optical interferometer.

EP 0 309 643 describes control elements used to influence and measure flow rates of a gaseous or liquid medium in a pipe line. The pipe line is provided with a mechanically readable pressure-measuring element in a locking element to measure the difference between the pressure values in the flowing medium before and after the locking element. The flow rate of the medium can be calculated per time unit from the position of the locking element and from the measured difference between the pressure values.

It is the object of the instant invention to create a low cost device for the precise optical measurement of pressure differences in media.

SUMMARY OF THE INVENTION

This object is accomplished in accordance with the present invention which provides a device for optically measuring a pressure difference in a medium by means of a Fabry-Perot interferometer. The device comprises a transparent plate and a diaphragm block connected to the transparent plate. The diaphragm block comprises a substrate, a measuring diaphragm formed along the inner surface of the substrate, and a spacer separating the inner surface of the transparent plate and the inner surface of the substrate. A first planar mirror is disposed on the inner surface of the transparent plate and a second planar mirror is disposed on the inner surface of the measuring diaphragm and together they constitute the Fabry-Perot interferometer. The measuring diaphragm is shiftable by a distance (H) in response to a pressure difference ($\delta p$) exerted on inner and the outer surfaces of the measuring diaphragm whereby the optical length (L) of the Fabry-Perot interferometer changes as a function of the pressure difference ($\delta p$). The substrate includes a depression on one side only so that the material remaining under the depression is of a predetermined thickness and comprises the measuring diaphragm. Since the measuring diaphragm constitutes a portion of the substrate and is a continuation of the crystalline structure of the substrate, there are no mechanical stresses at the joining points of the substrate and the measuring diaphragm. Preferably, the measuring diaphragm constitutes a doped layer of the substrate and serves as an etching barrier for the substrate.

DETAILED DESCRIPTION OF PREFERRED EMBODIMENTS

Figure 1:
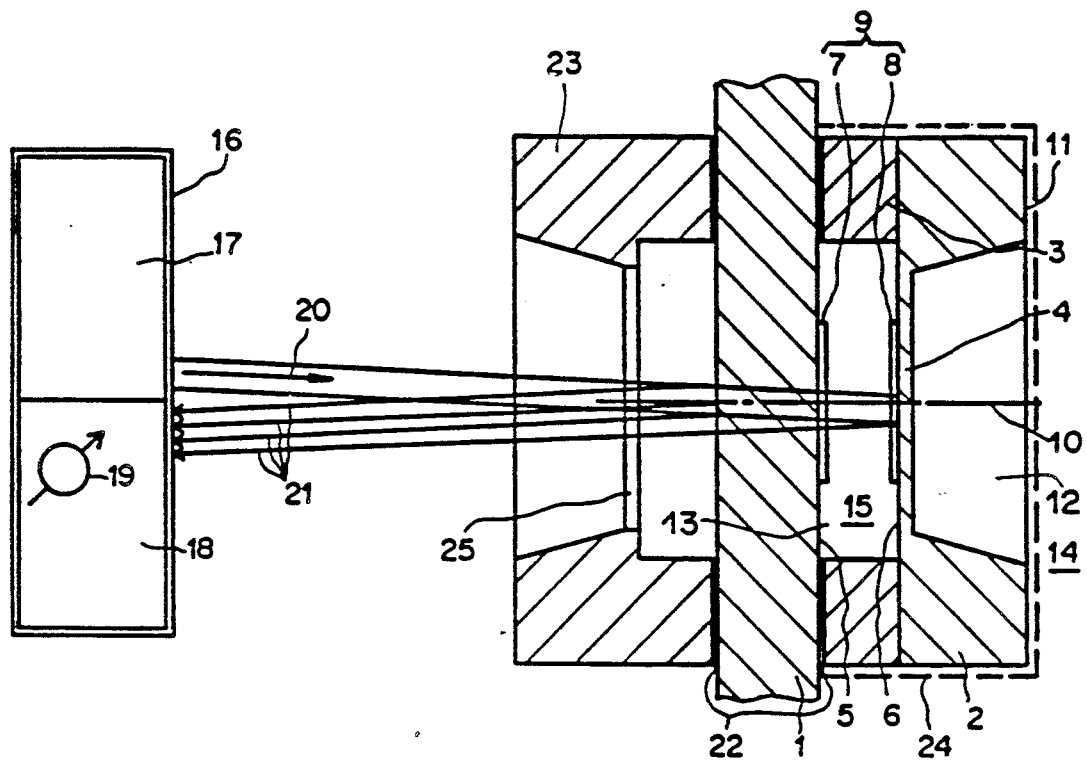
FIG. 1 shows an embodiment of the optical pressure-measuring device in accordance with the present invention.

In FIG. 1, the reference 1 designates a plane-parallel transparent plate, 2 a substrate and 3 a spacer firmly connecting the opposing and parallel surfaces of plate 1 and substrate 2 at a predetermined distance from each other. The substrate 2 can be provided in its center with a measuring diaphragm 4 made by removing material from the body of substrate 2, said diaphragm being stretched taut in the middle of the substrate 2 as by a frame. The measuring diaphragm 4 is formed from the material of the substrate 2 which merges seamlessly all around and without interruption into the crystalline structure of the membrane of the measuring diaphragm 4. It is therefore practically free of residual tensions that would lead to false or imprecise measurements.

A surface 5 of the plate 1 and an inner surface 6 of the substrate 2 which face each other are preferably polished and coated with a reflective coating. In the region of the measuring diaphragm 4, a first mirror 7 is provided on the surface 5 and a second mirror 8 is provided on the inner surface 6. The mirrors 7, 8 constitute Fabry-Perot interferometer 9. The optical axis 10 of the Fabry-Perot interferometer 9 is a common horizontal axis passing through the centers of the surfaces of the two mirrors 7 and 8.

The side of measuring diaphragm 4 facing towards the plate 1 is advantageously flush with the inner surface 6 of the substrate 2 so that the reflective coating which has been applied to the polished inner surface 6 also extends onto the surface of the measuring diaphragm 4 supporting the second mirror 8. In making the measuring diaphragm 4, material is removed from one side only of the substrate until the measuring diaphragm 4 of a predetermined thickness has been formed. Removal of material can be carried out for example from the outer side 11 of substrate 2 away from the second mirror 8. At this location, a single depression 12 which is characteristic of the measuring device is created in the substrate 2.

The spacer 3 is preferably made from the same material as the substrate 2 and surrounds an inner chamber 13 enclosed between the transparent plate 1 and the substrate 2. An outer chamber delimited by the outer side 11 and the depression 12 of substrate 2 contains a medium 14 at a pressure $P_1$ while the inner chamber 13 contains an inner-chamber medium 15 at a pressure $P_2$. Therefore, the forces caused by the pressure difference $\delta p$ act upon the measuring diaphragm 4 and provoke a diaphragm shift $H(\delta p)$ against the restoring forces in the measuring diaphragm 4 along the optical axis 10. If the pressure difference $\delta p$ is equal to zero, the measuring diaphragm 4 shows no diaphragm shift H. The measured distance along the optical axis 10 between the two mirrors 7 and 8, which defines the optical length L of the interferometer 9, has a value $A(\delta p=0)=A_o$ that is equal to the height of the spacer 3 decreased by the thickness of the two mirrors 7 and 8. The distance $A(\delta p)$ for a value of the pressure difference $\delta p$ that is other than zero therefore comes to:

$$A(\delta p)=A_o+H(\delta p).$$

Depending on the forces produced by the pressure difference $\delta p$, the diaphragm shift $H(\delta p)$ can assume positive as well as negative values. Preferably, the pressure $P_1$ is greater than the pressure $P_2$ so that the measuring diaphragm 4 will bear against plate 1 when an excessive pressure differential $\delta p$ exists and therefore cannot burst.

If the inner chamber 13 of the interferometer 9 is sealed hermetically for instance, and the inner-chamber medium 15 is gaseous, the optical length L of the interferometer 9 will vary depending only on the pressure of the medium 14 surrounding the measuring device. The measuring device can for example be used as the sensor of an altimeter. If the inner chamber 13 is evacuated, the measuring device will measure the absolute pressure $P_1$ directly in the outer chamber.

Gases or liquids can be used as the media 14 and 15, and the two media 14, 15 need not necessarily be the same on either side of the measuring diaphragm 4.

An evaluation unit 16 to detect and measure the diaphragm shift $H(\delta p)$ comprises at least a light source 17 and an analyzer 18 which displays the measured value on an appropriate display device 19 or transmits it to an additional evaluating device not shown here. The evaluation unit 16 measures the optical length L of the interferometer 9 in a known manner and thereby detects any change in the diaphragm shift $H(\delta p)$.

The first mirror 7 can be provided with a partially transparent coating, the reflection capacity of which for perpendicular light lies between 25% and 75%, while the second mirror 8 reflects more than 90% of the incident light.

The light source 17 transmits light along an incident ray 20 through the plate 1 and to the first mirror 7. The incident light ray 20 is reflected in part by the first mirror 7 and transmitted in part into the inner chamber 13. The light is reflected there by the second mirror 8 and transmitted through the mirror 7 to the evaluation unit 16 and together with the light reflected directly from the first mirror 7 constitutes a signal ray 21.

The intensity of the signal ray 21 has an interference pattern which depends on the optical length L and the wavelength of the light, and the analyzer 18 is able to evaluate this interference pattern as a measure of the diaphragm shift $H(\delta p)$. Since the distance between the two mirrors 7 and 8 as measured along the optical axis 10 is precisely one half of the optical length L, said optical length L changes by twice the diaphragm shift $H(\delta p)$. The display device 19 can be configured to show the diaphragm shift $H(\delta p)$ in units of length or the pressure difference $\delta p$ in units of pressure for instance.

The advantage of this measuring device is based on the almost complete absence of residual stresses in the thus produced measuring diaphragm 4 as these residual stresses adulterate the diaphragm shift $H(\delta p)$ noticeably, especially when small pressure differences $\delta p$ are involved, and therefore affect resolution in the lower portion of the measuring range.

If the two mirrors 7 and 8 are partially transparent and if the measuring diaphragm 4 is transparent, the interferometer 9 can also be used in a transmission mode with said interferometer 9 being located in the path of the light between the light source 17 and the analyzer 18. The optical length L will determine the transmission capability of the interferometer 9 depending on the wavelength of the light. It is also conceivable that the surfaces of plate 1 and of the measuring diaphragm 4 will themselves fulfill the roles of the mirrors 7 and 8 sufficiently well if they are made from a material that can be used with the media 14, 15.

The incident light 20 and the signal ray 21 are preferably transmitted in light conductors, e.g., in light-conducting fibers that are about 50 μm to 200 μm in diameter. Such thin light-conducting fibers afford great freedom in the placement of the measuring device and of the evaluating unit 16.

In an advantageous embodiment of the interferometer 9, the plate 1 is made of a non-metallic glass of good optical quality, and the substrate 2 is made from a single crystal material, e.g., a single crystal semiconductor material. The great strength afforded to the measuring diaphragm 4 by a single crystal material is especially advantageous.

Single crystal silicon is a preferred material because of its low cost, great strength and well known processing properties. Silicon can be worked easily and precisely by means and methods known from semiconductor production. The joining areas 22 located between the glass and silicon have a strength which is comparable to that of the two materials when said joining areas 22 have been produced by the process known as anodic bonding. These material combinations are highly corrosion resistant to a great number of media 14, 15.

Since silicon is transparent only in infrared light, the incident light 20 is preferably fed through plate 1 into the inner chamber 13 in the interferometer 9 equipped with the silicon measuring diaphragm 4 and the signal ray 21 is obtained by reflection along the same path. If the measuring device is operated only with light 20 in the infrared range in reflection or in transmission, then plate 1 is advantageously also made of silicon since no mechanical stresses capable of being transmitted to the measuring diaphragm 4 will be produced due to temperature changes.

Since a high temperature of approximately 400° C. is required for anodic bonding, and since the coefficient of thermal expansion of glass is different from that of silicon, mechanical stresses between plate 1 and substrate 2 will occur as a function of operating temperature after cooling of the measuring device and may be transmitted in the form of pressure stresses to the measuring diaphragm 4. These pressure stresses, just as the residual stresses, adulterate the resolution of the measuring device, especially if low pressure differences $\delta p$ are to be measured over a wide temperature range. If the measuring device is used for a heat quantity meter in a hot water pipe, an ambient temperature between +10° C.

and +120° C. can be expected for example, whereby the pressure difference δp of approximately 1 kPa to 10 kPa is to be measured with a required precision of 1%.

Advantageously, in the measuring device, the plate 1 is symmetrically clamped between the substrate 2 with spacer 3 and a compensating element 23 so that mechanical stresses occurring in plate 1 may be compensated for and plate 1 may be prevented from bending as a function of temperature. The undesirable mechanical stresses are thus kept away from the measuring diaphragm 4. For example, as illustrated in FIG 1, the compensating block 23 can be located on a surface of plate 1 away from the substrate 2. The compensating block 23 has preferably the same configuration and is made of the same material as the diaphragm block 24 which comprises the combination of the substrate 2 with the measuring diaphragm 4 and the spacer 3. The compensating block 23 and the diaphragm block 24 are anodically bonded on both sides to plate 1 and their optical axis 10 is the symmetry axis. Instead of the measuring diaphragm 4, the compensating block 23 is provided with an opening 25.

Figure 2:
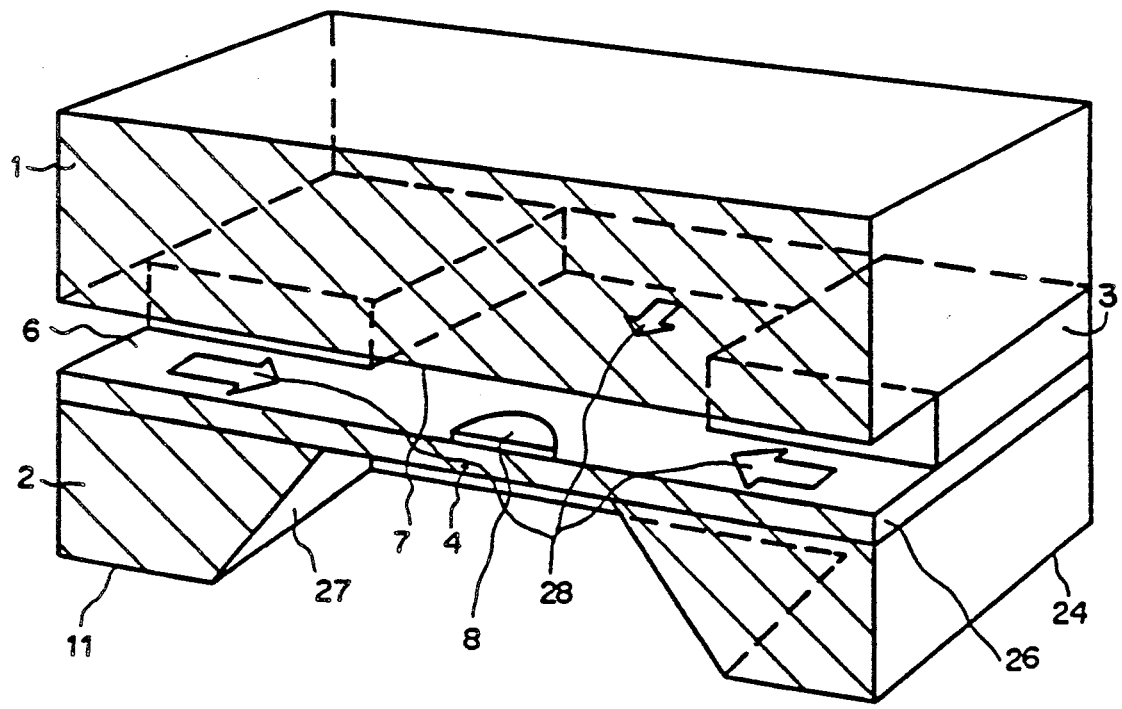
FIG. 2 shows a diaphragm block with inlet channels.

An embodiment of the measuring device is shown in the example of FIG. 2. The substrate 2 has a quadrilateral configuration with an edge length of approximately 2.5 mm and a thickness of approximately one-half millimeter. It is made of single crystal silicon with the inner surface 6 constituting the {1,0,0} plane of the crystal. In the drawing, the plate 1 set on top of the diaphragm block 24 is provided for the sake of clarity with broken lines showing the outlines of the elements 2 and 3 of the diaphragm block 24 below (FIG. 1).

A process which is suitable for simultaneous and therefore low cost manufacture of a plurality of diaphragm blocks 24 with little variation in manufacture uses a silicon wafer (not shown) as the starting material. The wafer is of the same thickness as the substrate 2, and its polished facet surfaces are constituted by the {1,0,0} planes of the crystal.

In a first step, a doped layer 26 is produced through the surface of the wafer which layer is destined to become the inner surface 6 of the substrate 2. Advantageously, the doped layer 26 has the same thickness as the intended thickness of the measuring diaphragm 4. Because the etching speed in the doped layer 26 is much slower than in the undoped silicon of the wafer, the thickness of the measuring diaphragm will not depend directly on the etching time but will be predetermined by the thickness of the doped layer 26. The extent and the type of doping depends on the etching process.

In a second step, a layer of epitaxial or polycrystalline silicon is applied on the inner surface 6. The thickness of this layer determines the designated height of the space 3. The substrate 2 and the material of the spacer 3 are thus bonded together intimately and free of stress in the diaphragm block 24.

In a third step, the epitaxial or polycrystalline silicon layer is etched down to the doped layer 26 through the openings of masks (not shown), whereby the spacers 3 are formed at the locations not covered by the masks. They enclose regions determined by the measuring diaphragms 4, said regions later becoming the inner chambers 13 (FIG. 1) and predetermined zones indented in the chamber 13. These zones constitute the inlet channels 28 shown in FIG. 2 by arrows and serve to aerate the inner chamber 13 for the measuring of the pressure difference δp.

A metallized glass plate which is transparent on one side and which will serve as the plates 1 and is of the same size as the wafer, is pressed with its metallized surface onto the spacers 3. The glass plate projects over the surface of the wafer and is bonded anodically. The anodic bonding follows the metallization, between two preceding manufacturing steps, of either the entire wafer over the inner side 6 or the production of only small surfaces of approximately 30 to 300 μm diameter which constitute the mirrors 8 in the center of the measuring diaphragms 4.

In the last manufacturing step, in order to expose the measuring diaphragms 4, the outer surface 11 of the wafer is masked by means of an etching mask not shown here which may have square etching windows for example at the locations chosen for the depressions 12 (FIG. 1). Since side walls 27 of the depression 12 are constituted by the {1,1,1} planes of the crystal for reasons of etching technology, the depression 12 is in the shape of a truncated pyramid, the bottom and cover surfaces of which are determined solely by the window size in the etching mask on the outside 11. The doped layer 26 preferably acts as an etch-stopping layer limiting the depth of material removal so that all the measuring diaphragms 4 of the wafer have precisely the same dimensions and the sam mechanical properties upon completion of the etching process.

After removal of all mask remnants, the wafer is divided into the individual measuring devices by means of a diamond saw.

In another process, the spacers 3 can also be made of silicon dioxide in the above-mentioned second step, as this requires fewer manufacturing steps. An oxide layer is initially produced evenly over the entire surface of the wafer at a depth which is equal in height to the spacers 3. The oxide covering the measuring diaphragms 4 is then removed down to the doped layer 26 thereby forming the spacers 3 and the inner chambers 13. Following this the measuring diaphragms 4 and the spacers 3 are coated with a reflective metallic coat, e.g., with aluminum. The metal coat causes secure adhesion between oxide and glass at the anodically bonded joining regions.

Figure 3:
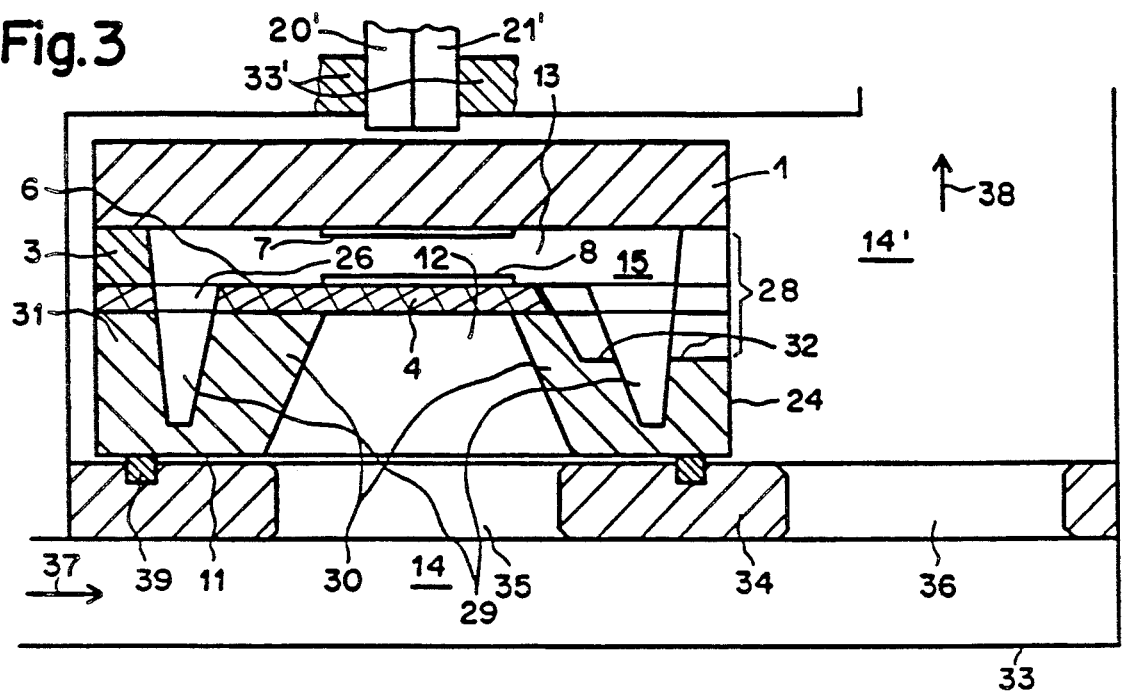
FIG. 3 shows the diaphragm block with a decoupling groove.

In an embodiment intended to reduce heat-caused stresses in the measuring diaphragm 4, the diaphragm block 24 of FIG. 3 is provided with a wedge-shaped decoupling groove 29 of predetermined depth. The decoupling groove 29 is formed in the third manufacturing step, together with the inlet channels 28 if these are present, by etching through openings in the doped layer 26, serving as an etching mask, between measuring diaphragm 4 and spacer 3, coming from the inner surface 6 and into the substrate 2 (FIG. 2). The decoupling groove 29 surrounds the measuring diaphragm 4 all around in such manner that a distinctly offset diaphragm support 30 is produced in the diaphragm block 24. The single crystal diaphragm block 24 is therefore developed into the diaphragm support 30 and the measuring diaphragm 4 and into the supporting walls 31, with the diaphragm support 30 and the supporting walls 31 being connected via the bottom of the decoupling groove 29. Appropriate doping from the outside 11 in the area of the decoupling groove 29 can limit its depth in a predetermined manner. The decoupling groove 29 has the advantage that mechanical stresses in the supporting walls 31 are not transmitted to the diaphragm support 30 or to the measuring diaphragm 4. In many applications, the compensating block 23 (FIG. 1) can therefore be omitted. A measuring device with high resolution, e.g., better than 1%, can be constructed with the compensating block 23 as well as with the decoupling groove 29.

The cross-section of the inlet channels 28 depends on the viscosity of the inner-chamber medium 15. If the cross-section of the inlet channels is too small, losses due to friction in the inlet channels 28 cause slower inflow or outflow of the inner-chamber medium 15 and the measuring device will have undesirable sluggishness or even a hysteresis in the display of the pressure difference $\delta p$. If the doped layer 26 is provided with indentations corresponding to the course of the inlet channels 28, the doped layer 26 will act as an etching mask for the enlargement of the inlet channel cross-sections by lowering channel bottoms 32 into the substrate 2, e.g., down to the bottom of the decoupling groove 29.

In an example of an embodiment with the above-mentioned substrate 2 having a square base surface area of 6.25 mm$^2$, the plate 1 has a thickness of approximately 0.5 to 2 mm, the measuring diaphragm 4 has a thickness of approximately 10 $\mu$m while the height of the spacer 3 is approximately 3 $\mu$m. The distance between the two mirrors 7 and 8 therefore has the value $A_o$ of approximately 2 $\mu$m. The inlet channels 28 let out on either lateral surface of the diaphragm block 24 and each is 0.6 mm long and has a cross-section of 0.0012 mm$^2$. If channel bottoms 32 are lowered in the substrate, the cross-section of the inlet channels may be up to 0.15 mm$^2$.

In an example of an application for the measurement of a flow-through quantity of a medium 14, 14', a pipe system 33 is provided with a planar separating wall 34 (see FIG. 3). The separating wall 34 is provided with an opening 35 and a measuring orifice 36. The medium 14 flows towards the separating wall 34 in a direction of flow 37, forces itself through the measuring orifice 36 and leaves the separating wall 3 in the form of medium 14' in an outflow direction 38. The measuring device is installed in the pipe system 33 on the side of separating wall 34 towards the medium 14' without interfering with the flow at the measuring orifice 36 and is set with its outer side 11 on the separating wall 34 in such manner that the opening 35 is sealed by means of the sealant 39 between the outer side 11 and the separating wall 34 so that the medium 14 passes through opening 35 and enters only so far as into the depression 12. The medium 14,14' can however also flow in the direction opposite to directions 37 and 38, and in that case the pressure difference $\delta p$ has the opposite algebraic sign.

The first medium 14 differentiates itself from the second medium 14, only through the value of pressure $P_2$ which is decreased by the pressure difference $\delta p$ as the medium 14 flows through the measuring orifice 36 and which is proportional to the flow rate. In the pipe system 33, the first medium 14 flows towards the measuring orifice 36 with a pressure $P_1$ and acts from the depression 12 upon the measuring diaphragm 4. After the separating wall 34, the second medium 14, is at the pressure $P_2$ which spreads via the inlet channels 28 into the inner-chamber medium 15 and exerts pressure $P_2$ from the inner chamber 13 upon the measuring diaphragm 4.

In an example, the light conducting fiber bundles 20, and 21' for the incident light 20 (FIG. 1) and for the signal ray 21 (FIG. 1) are taken through a wall 33' of the pipe system 33 and are directed with their one end at a perpendicular upon the plate 1. The light fiber bundles 20' and 21' are set tightly together into the wall 33' to avoid leak losses of the pipe system 33.

The measuring device can also be used to measure gas and liquid quantities if the pressure difference $\delta p$ is integrated over time. The measuring arrangement is small due to the fact that the measuring diaphragm 4 has only a small inertial mass. Very small pressure differences $\delta p$ can therefore be measured precisely. The measuring device is well-suited to take measurements in an environment subjected to much vibration such as for example to monitor fuel consumption in combustion motors or as sensors in the adjusting device described in EP 309 643 in a heating medium pipe driven by a pump.

Fine suspended particles in the medium 14 or 14' can spread out into the inner-chamber medium 15 in case of pressure changes. They can clog the inlet channels 28 and impair pressure compensation. They may also enter the inner chamber 13 through the inlet channels 28 and settle on the mirrors 7, 8.

To overcome this, in an advantageous embodiment, the inner chamber 13 and the inlet channels 28 are filled with a viscous transparent inner medium 15. Gels, e.g., silicon-gel, or oils, e.g., silicon oil, transmit the pressure $P_2$ to the measuring diaphragm 4 and keep the suspended particles away from the critical parts 7, 8, and 28.

Figure 4:
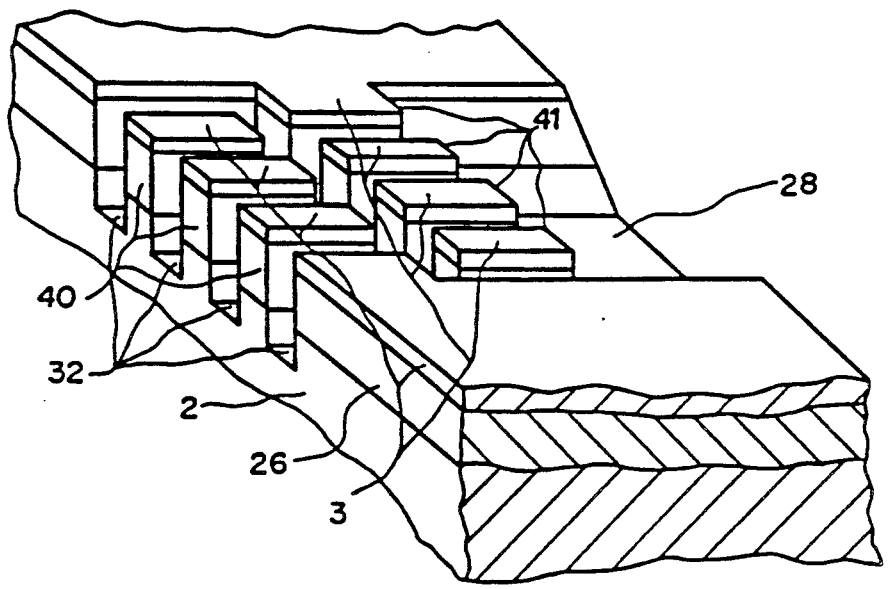
FIG. 4 shows a microfilter in an inlet channel of the device.

The inlet portion of the inlet channel 28 shown in FIG. 4 without plate 1, advantageously is provided with a microfilter preventing the suspended particles from entering the inner chamber 13 in case of pressure changes. The microfilter shown in this example can be produced at the same time as the inlet channels 28 are etched. The etching mask is provided with appropriate windows so that islands 40 and 41 offset in relation to each other are produced during etching in the inlet portion of the inlet channel 28, said islands 40, 41 being separated from each other by narrow and winding passages etched down to the channel bottom 32. Each island 40 and 41 is provided with a portion of the spacer 3 at the surface facing towards the plate 1 by means of which said island 40 or 41 is bonded to the plate 1 (FIG. 3).

The outlets of the inlet channels 28 can also be covered with a commercially obtainable glass microfilter.

Figure 5:
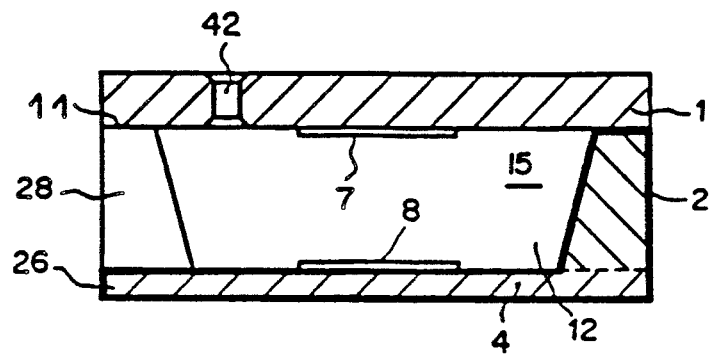
FIG. 5 shows the inventive measuring device with an inner chamber formed by a depression in a substrate.

In measuring devices according to FIG. 5, with less stringent precision requirements, the outside 11 of the substrate 2 is placed against the plate 1 and is connected directly to said plate 1, e.g., by anodic bonding. The doped layer 26 is on the surface of substrate 2 opposite the outer side 11. The doped layer 26 differentiates itself only through the doping from the material of the substrate 2; this is indicated by the broken line in the drawing of FIG. 5. The depression 12 constitutes the chamber containing the inner-chamber medium 15 between the two mirrors 7 and 8. The second mirror is attached in this embodiment on the covering surface of the depression 12 which is etched in the form of a truncated pyramid. The inlet channels 28, if present, are etched into the substrate 2 at the same time as the measuring diaphragm 4, coming from the outer surface 11 by etching down to the doped layer 26. The advantage of this arrangement lies in that it requires a smaller number of manufacturing steps.

Instead of the inlet channels 28 extending at a parallel to plate 1, the depression 12 or the inner chamber 13 (FIG. 3) can also be hydraulically connected to the outer chamber via aeration channels 42 located in plate 1 outside the path of the light, preferably if the plate 1 serves at the same time as the separating wall 34 (FIG. 3).

While the invention has been described by reference to specific embodiments, this was for purposes of illustration only and should not be construed to limit the spirit or the scope of the invention. Numerous alternative embodiments will be apparent to those skilled in the art.

I claim:

1. Device for optically measuring a pressure difference in a medium, comprising
    a Fabry-Perot interferometer comprising a first planar mirror and a second planar mirror aligned parallel to said first mirror,
    a transparent plate having a first surface on which said first planar mirror is located, and
    a diaphragm block juxtaposed opposite said transparent plate, said diaphragm block comprising a substrate having first and second surfaces, a single depression extending into said substrate from said first surface of said substrate to decrease the thickness of said substrate to a predetermined value in a predetermined region thereby forming a measuring diaphragm along said second surface of said substrate, and a spacer separating said transparent plate from said substrate, an inner chamber being formed between said first surface of said transparent plate and said second surface of said substrate, said second planar mirror being located on said measuring diaphragm,
    said measuring diaphragm being shiftable by a distance (H) in response to a pressure difference ($\delta p$) exerted by said medium on first and second surfaces of said measuring diaphragm so that the optical length (L) of said Fabry-Perot interferometer changes as a function of said pressure difference ($\delta p$).

2. The device of claim 1 wherein said first surface of said measuring diaphragm is flush with said second surface of said substrate.

3. The device of claim 1 wherein said spacer fixedly connects said plate to said substrate parallel to each other and at a predetermined distance.

4. The device of claim 1 wherein said first surface of said substrate is connected directly to said plate so that said depression is located between said first and second mirrors.

5. The device of claim 1 wherein said plate is made from a non-metallic glass and said support plate is made from single crystal silicon.

6. The device of claim 1 wherein said plate and said substrate are each made from single crystal silicon.

7. The device of claim 1 wherein said substrate is made from single crystal silicon and said measuring diaphragm constitutes a doped layer of predetermined thickness of said substrate, said doped layer constituting an etching barrier of said substrate.

8. The device of claim 1 wherein said first surface of said measuring diaphragm is flush with said second surface of said substrate, wherein said substrate further comprises a decoupling groove surrounding said measuring diaphragm and opening into said inner chamber, a diaphragm support, and supporting walls surrounding said diaphragm support and connected to said diaphragm support via the bottom of said decoupling groove, wherein said spacer holds said plate at a predetermined distance from and parallel to said measuring diaphragm, and wherein said plate is fixedly connected to said supporting walls by said spacer.

9. The device of claim 1 further comprising channels in said substrate providing fluid communication between said inner chamber and said first surface of said substrate.

10. The device of claim 1 further comprising channels in said substrate providing fluid communication between said inner chamber and said first surface of said substrate, and a transparent viscous medium located in said inner chamber and said channels.

11. The device of claim 1 further comprising channels in said substrate providing fluid communication between said inner chamber and said first surface of said substrate, and a microfilter disposed in each of said channels.

12. The device of claim 1 further comprising a compensating element, said plate being firmly connected between said compensating element and said diaphragm block.

* * * * *

UNITED STATES PATENT AND TRADEMARK OFFICE
CERTIFICATE OF CORRECTION

PATENT NO. :   5,128,537
DATED      :   July 7, 1992
INVENTOR(S) :  Beat HÄLG

It is certified that error appears in the above-identified patent and that said Letters Patent is hereby corrected as shown below:

On the title page, after line labelled "[22]"

add the following new lines:

-- [30]   Foreign Application Priority Data

June 8, 1990 [CH]   Switzerland ....... 01 928/90

Signed and Sealed this

Seventh Day of September, 1993

Attest:

BRUCE LEHMAN

*Attesting Officer*        *Commissioner of Patents and Trademarks*